(12) United States Patent
Meade, II et al.

(10) Patent No.: US 6,678,750 B2
(45) Date of Patent: Jan. 13, 2004

(54) WIRELESS NETWORKED PERIPHERAL DEVICES

(75) Inventors: William K. Meade, II, Eagle, ID (US); James S. Tagg, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 09/871,965

(22) Filed: Jun. 4, 2001

(65) Prior Publication Data

US 2002/0184304 A1 Dec. 5, 2002

(51) Int. Cl.$^7$ ................................................. G06F 3/00
(52) U.S. Cl. ..................... 710/7; 710/2; 710/8; 710/15; 342/357.08
(58) Field of Search ............................. 710/1–3, 8, 10, 710/15, 7; 342/357.08

(56) References Cited

U.S. PATENT DOCUMENTS

| | | | |
|---|---|---|---|
| 6,256,503 B1 * | 7/2001 | Stephens | 455/456.6 |
| 6,438,663 B1 * | 8/2002 | Agarwal et al. | 711/148 |
| 6,446,004 B1 * | 9/2002 | Cao et al. | 701/213 |
| 6,470,189 B1 * | 10/2002 | Hill et al. | 455/517 |
| 6,477,581 B1 * | 11/2002 | Carpenter et al. | 709/238 |
| 6,574,663 B1 * | 6/2003 | Bakshi et al. | 709/223 |

* cited by examiner

Primary Examiner—Jeffrey Gaffin
Assistant Examiner—Eron Sorrell

(57) ABSTRACT

An apparatus for, and a method of, organizing and utilizing networked peripheral device include peripheral devices, which are aware of their respective geographical location and operational capabilities, and self-organization of the peripheral devices into a cluster of networked peripheral devices based on the operational capability of each respective peripheral device and the relative physical proximity with respect to each other. The host computer is also made aware of its geographical location. One or more peripheral device(s) that are optimally suited to fulfill the request is selected based on the physical proximity of the selected peripheral device(s) to the requesting user host computer and/or the capabilities of the selected peripheral device(s). The selection of the optimal peripheral device(s) is made by the networked peripheral devices without requiring the user of the host computer to know the topology of the network, e.g., the locations and capabilities of each of the networked peripherals. Device driver(s) for the selected peripheral device(s) may be dispensed to the host computer as required in order for the host computer to utilize the selected peripheral device(s). In an embodiment, the host computer may include its geographical location in a request for a peripheral device service. The service request including the geographical location information of the user host computer may enable an on-line service provider, e.g., a provider of an on-line printing service, to direct the service request to the closest service center that may be able to fulfill the request by the user.

20 Claims, 6 Drawing Sheets

WIRELESS NETWORKED PERIPHERAL DEVICES

TECHNICAL FIELD

The invention relates to computers and computer networks. More particularly, the invention relates to computer peripheral devices and networked organization and utilization thereof.

BACKGROUND OF THE INVENTION

A modern computer system typically includes one or more peripheral devices, e.g., a printer, a scanner, a facsimile machine, a display screen, a keyboard, a mass storage device, or the like. In particular, a hard-copy device, e.g., a printer, a facsimile machine, or the like, allow conversion of electronic information, e.g., a document file, into printed texts and/or graphics, and are ubiquitous parts of modern computer systems. Typically, the electronic information is sent from a requesting entity, e.g., a personal computer (PC), laptop computer, personal digital assistant (PDA) or the like (collectively referred to hereinafter as a "host computer"), to a hard-copy device through a communication link. The communication link may be, for example, a direct communication cable through parallel (or serial) communication port interfaces, or through a network, e.g., a local area network (LAN) or a wide area network (WAN).

Particularly, in the case where peripheral devices are connected to a host computer through a network, finding and making use of a peripheral device that may be available in the network becomes increasingly important and yet less intuitive. Often, a host computer does not know which one of the available peripheral devices provides the optimal service, mainly because the network connection path between the user host computer and the peripheral device is less intuitive than the case with a direct cable connection. This requires a network-centric pre-arrangement of the peripheral devices, which in turn requires that each user host computer to know the logical and/or physical locations of the peripheral devices within the network in order to establish a communication link with a desired one of the peripheral devices available over the network. Typically, this is accomplished by a user of a host computer manually searching for one desired peripheral device from the available peripheral devices on the network, or by a network administrator familiar with the topology of the network making the selection for the user.

The above conventional network-centric static arrangement of the peripheral devices suffers from many shortcomings, particularly when a host computer is accessing the network through a wireless communication means, e.g., when the geographical location of the user relative to the peripheral devices in the network may not be fixed. As society becomes increasingly mobile, more and more user host computers are being equipped with mobile communication capabilities, allowing users of host computers to become mobile. When a user moves into a particular geographical region of a computer network, the user, without a complete knowledge of the topology of the network, would not know which available peripheral devices are within close proximity of the current location of the user and/or which peripheral device(s) may have the optimal capabilities for the user.

For example, recently introduced electronic commerce services, e.g., ones offered by the Sir Speedy, Inc. of Mission Viejo, Calif. (http://www.sirspeedy.com) or by the Kinko's Inc. of Ventura, Calif. (http://www.kinkos.com), offer on-line printing services over the Internet. In these on-line printing services, a user may send a print request to an electronic commerce server, which than directs the print job to print centers selected by the user. While these on-line printing services typically allow a user to manually select the nearest printing center from which the completed print job may be picked up, e.g., based on the name of the city, the zoning improvement plan (ZIP) code, or the like, the user is nevertheless still required to know his or her current geographical location to base the selection of the print center.

However, when a user is accessing the on-line printing service through a mobile communication network while moving into, or passing through, a particular geographical location, the user may not be aware of his or her exact geographical location, and may be unable to select a nearby print center. Thus, it is desirable for the user to be able to locate a peripheral device that is within the nearest proximity to the user particularly when the user is in an unfamiliar geographical location and when the user is not aware of the topology of the network.

Moreover, because the above described network-centric arrangement of peripheral devices are fixedly arranged, when a new peripheral device is added to the network, the topology of the network must be manually changed to reflect the addition. This network topology change must be made known to the user. For example, a peripheral device having a better capability and/or in closer proximity to a user may be added, and yet the user may not be aware, and thus is unable to take advantage of the newly added peripheral device. Moreover, a user must be aware of features and capabilities of the peripheral devices available on the network in order to fully utilize the available capabilities, and thus is required to manually keep track of the capabilities of the peripheral devices.

The above described manual selection of a peripheral device from the available networked peripheral devices, and the manual network topology information update and maintenance of a network-centric arrangement are inefficient, inconvenient and wasteful of time and effort.

Thus, there is a need for a more efficient and convenient system and method for locating and using networked peripheral devices, which do not require user's knowledge of the topology of the network, and which do not require a manual search for the peripheral devices.

Thus, there is also a need for a more efficient and convenient system and method for utilizing networked peripheral devices, which do not require manual update and maintenance of the information regarding the network topology.

SUMMARY OF INVENTION

In accordance with the principles of the present invention, a method of utilizing one or more peripheral devices by a host computer over a network comprises providing a geographical location determination capability to the host computer, the geographical location determination capability allowing the host computer to determine a current location of the host computer automatically without an intervention by a user of the host computer, sending a peripheral device service request from the host computer to the network, the peripheral device service request including a location information indicating the current location of the host computer, selecting ones of the one or more peripheral devices being in close proximity with the host computer based at least in part on the location information, and fulfilling the peripheral service request by the selected ones of the one or more peripheral devices.

In addition, in accordance with another aspect of the principles of the present invention, a method of utilizing one or more peripheral devices by a host computer comprises providing each of the one or more peripheral devices a geographical location determination capability, the geographical location determination capability providing a geographic location of an associated one of the one or more peripheral device, detecting, by at least a first one of the one or more peripheral devices, presence of one or more peripheral devices within a predetermined distance from the at least first one of the one or more peripheral devices, and organizing the detected ones of the one or more peripheral devices into a cluster of peripheral devices, the cluster being configured to allow peripheral devices with complementary capabilities (i.e., color, monochrome, and devices with paper finishing capabilities) to fulfill a service request from the host computer collectively as one logical device based at least in part on the service capabilities database.

In accordance with yet another aspect of the principles of the present invention, a networked peripheral devices system comprises a communication network, and a cluster of one or more peripheral devices, each of the one or more peripheral devices having a geographical location determination capability, the geographical location determination capability providing a geographic location of an associated one of the one or more peripheral device, the one or more peripheral devices being within a predetermined distance from each other, the cluster being configured to fulfill a service request from a host computer received over the communication network collectively as one logical device.

DESCRIPTION OF DRAWINGS

Features and advantages of the present invention will become apparent to those skilled in the art from the following description with reference to the drawings, in which.

DETAILED DESCRIPTION OF THE PREFERRED EMBODIMENT

For simplicity and illustrative purposes, the principles of the present invention are described by referring mainly to an exemplar embodiment thereof, particularly with references to an exemplary embodiment involving hard-copy devices. However, one of ordinary skill in the art would readily recognize that the same principles are equally applicable to, and can be implemented in, any peripheral devices that can be organized as a network or networks, and that any such variation would be within such modifications that do not depart from the true spirit and scope of the present invention.

In accordance with the principles of the present invention, an apparatus for, and a method of, organizing and utilizing networked peripheral device include peripheral devices, which are aware of their respective geographical location and operational capabilities, and self-organization of the peripheral devices into a cluster of networked peripheral devices based on the service capability of each respective peripheral device and the relative physical proximity with respect to each other.

The host computer is also made aware of its geographical location. One or more peripheral device(s) that are optimally suited to fulfill the request is selected based on the physical proximity of the selected peripheral device(s) to the requesting user host computer and/or the capabilities of the selected peripheral device(s). The selection of the optimal peripheral device(s) is made by the networked peripheral devices without requiring the user of the host computer to know the topology of the network, e.g., the locations and capabilities of each of the networked peripherals. Device driver(s) for the selected peripheral device(s) may be dispensed to the host computer as required in order for the host computer to utilize the selected peripheral device(s).

In an embodiment of the present invention, the host computer may include its geographical location in a request for a peripheral device service. The service request including the geographical location information of the user host computer may enable an on-line service provider, e.g., a provider of an on-line printing service, to direct the service request to the closest service center that may be able to fulfill the request by the user.

Figure 1:
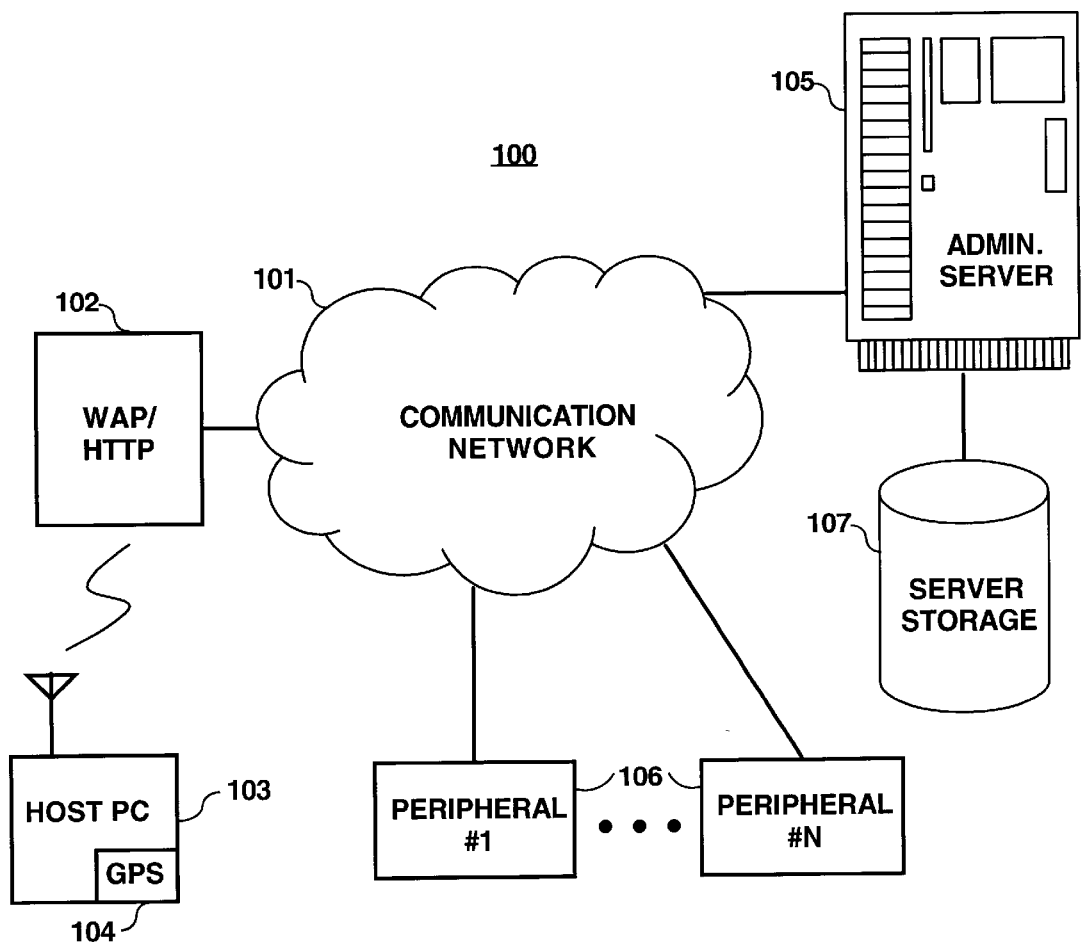
FIG. 1 is a block diagram showing relevant portions of an exemplary embodiment of the networked peripheral devices system in accordance with the principles of the present invention.

In particular, FIG. 1 shows an exemplary embodiment of the networked peripheral device system 100 in accordance with the principles of the present invention. The networked peripheral device system 100 comprises a communication network 101, which may be, e.g., a wide area network (WAN) (e.g., the Internet including the world-wide-web (WWW), the public switched telephone network (PSTN), or the like), a wireless communication network, (e.g., a personal communications service (PCS) network, a code division multiple access (CDMA) network, a time division multiple access network (TDMA), or the global system for mobile communications (GSM), or the like), or a combination thereof. Peripheral devices 106 may be any peripheral devices, e.g., a printer, a scanner, a facsimile machine, a display screen, a keyboard, a mass storage device, or the like.

A host computer 103 may comprise, e.g., a personal computer (PC), laptop or portable computer, personal digital assistant (PDA) or the like, and communicates with a network administration or service provider server 105 and one or more of peripheral devices 106 through the communication network 101. Although for simplicity, only one host computer 103 and administration server 105 are shown, it should be understood and readily apparent that there may be any number of host computers 103 and administration servers 105. In an embodiment of the present invention, the host computer 103 may be equipped with a wireless communication device (not shown)), e.g., a wireless modem, a BLUETOOTH wireless connection device sold by the Telefonaktiebolaget L M Ericsson, whose US corporate office is located in Richardson, Tex. (more information may be obtained from their website, http://www.bluetooth.com/), or the like, to establish a wireless communication link with the communication network 101.

In an embodiment of the present invention, the host computer 103 may communicate with the communication network 101 using radio frequency (RF) signals through a wireless communication network (not shown), which may comprise, one or more base stations (BS), home location registers (HLR) (not shown), several visitor location registers (VLR) (not shown), mobile switching center(s) (MSC) (also not shown), all of which are well known to those familiar with wireless telecommunication networks.

In accordance with the principles of the present invention, the host computer 103 includes a global positioning system (GPS) device 104 that provides the current geographical location of the host computer 103. Although in this preferred embodiment of the present invention, a GPS device is utilized to ascertain the current location of a host computer 103, the location information may be obtained using any other methods, e.g., by the identification of the cell number in the personal communications service (PCS) network, the identity of the nearest base station (BS) or any other known radiolocation methodologies, e.g., the strongest signal method, the time of arrival (TOA) method, the angle of arrival (AOA), the differential time of arrival (TDOA) method or the like, which are well known to those familiar with wireless telecommunication technology.

The administration server 105 maintains a topology database, which contains information with respect to the locations, features and capabilities of the peripheral devices 106, in the server storage 107. The administration server 105 may also have, stored in the server storage 107, the device drivers, which provide low-level interfaces that translate abstract device operations into actual device operations which are hardware-dependent and specific to the particular peripheral, and other software components necessary for the operation of each of the peripheral devices 106.

The administration server 105 receives a service request from the host computer 103, provides and routes the request to one or more of the peripheral devices 106, and, if necessary, e.g., when the requesting host computer 103 does not already have, supplies the device driver and the other software component associated with the selected one or more peripherals.

For example, in a particular embodiment of the present invention, the administration server 105 may be an on-line printing service server where each of the peripherals 106 being a printing center. The user of the host computer 103 may send a service request along with information with respect to the location of the host computer 103 to the administration server 105 using a web browser, e.g., the NAVIGATOR from the Netscape Communications Corporation of Mountain View, Calif., USA, or the INTERNET EXPLORER from the Microsoft Corporation of Redmond, Wash., USA, installed on the host computer 103.

In an embodiment of the present invention, the host computer 103 may communicate with the communication network 101 and with other entities in the networked system 100 using the Transmission Control Protocol/Internet Protocol (TCP/IP) and/or the hypertext transport protocol/Internet protocol (HTTP/IP). In this particular embodiment, the host computer 103 may utilize a wireless communication protocol, e.g., inter alia, the wireless markup language (WML) of the wireless applications protocol (WAP) through a WAP/HTTP gateway 102, e.g., ones commercially available from the Phone.com, Inc. of Redwood City, Calif. Alternatively, the host computer 103 may utilize a wired communication conduit, e.g., a modem connection, to interface with the WAP/HTTP gateway 102. It should, however, be readily apparent to one of ordinary skill that any other communications protocols may be utilized without departing from the true spirit and scope of the present invention.

Figure 2:
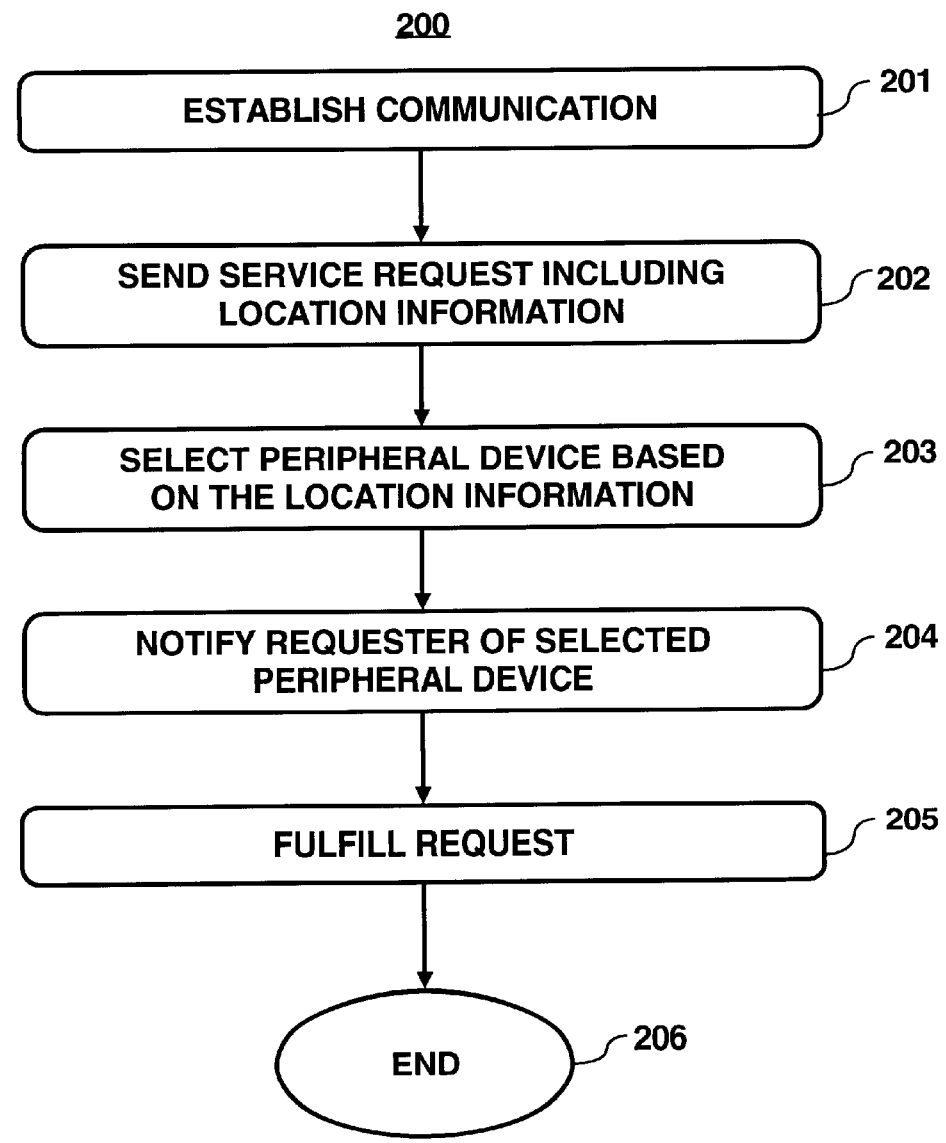
FIG. 2 is an exemplary flow diagram of the peripheral device service request handling process in accordance with an embodiment of the present invention.

The administration server 105 receives the service request from the host computer 103, and selects the optimal one of the peripherals 106 to fulfill the request based on the geographical location of the host computer 103. Referring to FIG. 2, and to an exemplary embodiment where the administrator server 105 provides an on-line printing service, the peripheral device service request handling process in accordance with an embodiment of the present invention will now be described.

As shown, the process begins in step 201, during which a host computer 103 establishes a communication link with the administration server 105, e.g., by providing the universal resource locator (URL) of the administration server 105. Once the communication link is established through the communication network 101, the administration server 105 may provide a user interface (not shown), which may comprise at least a hypertext markup language (HTML) page and/or a wireless markup language (WML) page, also referred to as a web page. In step 202, using the user interface web page, the host computer 202 sends a service request, e.g., a request to print a document, a file or the like, along with its current location information to the administration server 105. Although, by way of example only, the user interface is described herein as a HTML page, it should be understood by those skilled that the user interface may be any interface providing a user with the capability to submit a service request.

Upon receiving the service request and the location information, the administrative server 105, in step 203, selects one or more optimal peripheral device(s), e.g., in the on-line printing service example, the closest printing center, to fulfill the request based on the request and/or the location information, and routes the request to the selected one or more peripheral device(s).

In step 204, the administration server 105 sends a notification message, e.g., a message displayed in the user interface web page, indicating the identity of the selected peripheral device(s), e.g., including the location of the selected peripheral device(s).

In an embodiment of the present invention, the peripheral device(s), particularly the printing centers of an on-line printing service, may be connected through a wireless data communications protocols, e.g., IEEE 801.11b, WAP, BLUETOOTH or the like, and physically located in various geographical locations, e.g., in different neighborhoods, cities, countries and the like. Alternatively, wired communication conduits, e.g., telephones, Ethernet, etc., may interface peripheral device(s) with the printing centers. It should, however, be readily apparent to one of ordinary skill that any other communications protocols may be utilized without departing from the true spirit and scope of the present invention.

The notification message may include, e.g., an address at which the peripheral device(s), e.g., a printing center, is located, and may also include directions, maps (e.g., ones being provided by the Mapquest.com of New York, N.Y., whose current URL is http://www.mapquest.com/) and/or the like to allow the user of the host computer 103 to conveniently find the selected peripheral device(s) from his/her current location.

Finally in step 205, the service request is fulfilled by the selected peripheral device(s) (or the selected printing center). The user of the requesting host computer 103 may obtain the result or the output of the service from the peripheral device or the printing center, which may be found based on the location information included in the notification message.

It can be appreciated that the above described system and method for locating and using networked peripheral devices do not require the user's knowledge of the topology of the network, nor a manual search for the peripheral devices by the user.

Figure 1A:
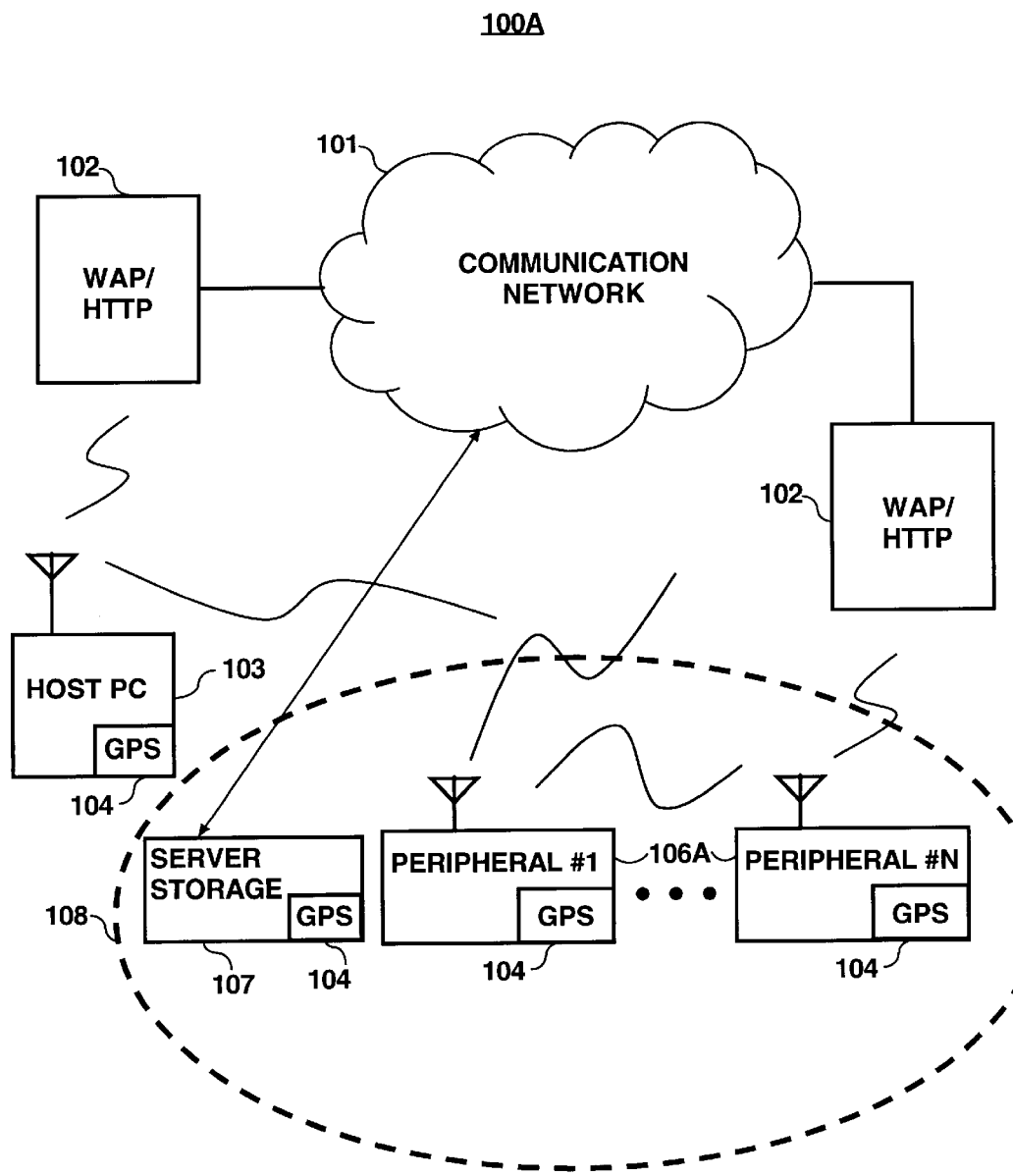
FIG. 1A is a block diagram showing relevant portions of an alternative exemplary embodiment of the network system including self-organizing wireless peripheral devices in accordance with the principles of the present invention.

FIG. 1A illustrates another embodiment of the networked peripheral devices system 100A in accordance with the principles of the present invention. The system 100A comprises a communication network 101, one or more WAP/HTTP gateway(s) 102 and one or more host computer(s) 103 and a server storage 107 as previously described above. The network server storage 107 is further configured to provide storage service for users of the communication network 101 and is equipped with a location and/or proximity determination device 104, e.g. a GPS device, a BLUETOOTH device or the like. In addition, the system 100A comprises one or more peripheral device(s) 106A, each of which is equipped with a wireless communication device, e.g., a wireless modem, a BLUETOOTH wireless connection device, or the like, to establish a wireless communication link with other ones of the peripheral device(s) 106A, any of the one or more host computer(s) 103 and the communication network 101. The peripheral device(s) 106A, the host computer(s) 103 and the communication network 101 communicate with each other using communications protocols, e.g., the TCP/IP, as previously described. Each of the peripheral device(s) 106A is equipped with a location and/or proximity determination device 104, e.g. a GPS device, a BLUETOOTH device or any other radiolocation device or components implementing any of the known radiolocation methodologies, e.g., cell identification method, the strongest signal method, the time of arrival (TOA) method, the angle of arrival (AOA), the differential time of arrival (TDOA) method, or the like.

Figure 3:
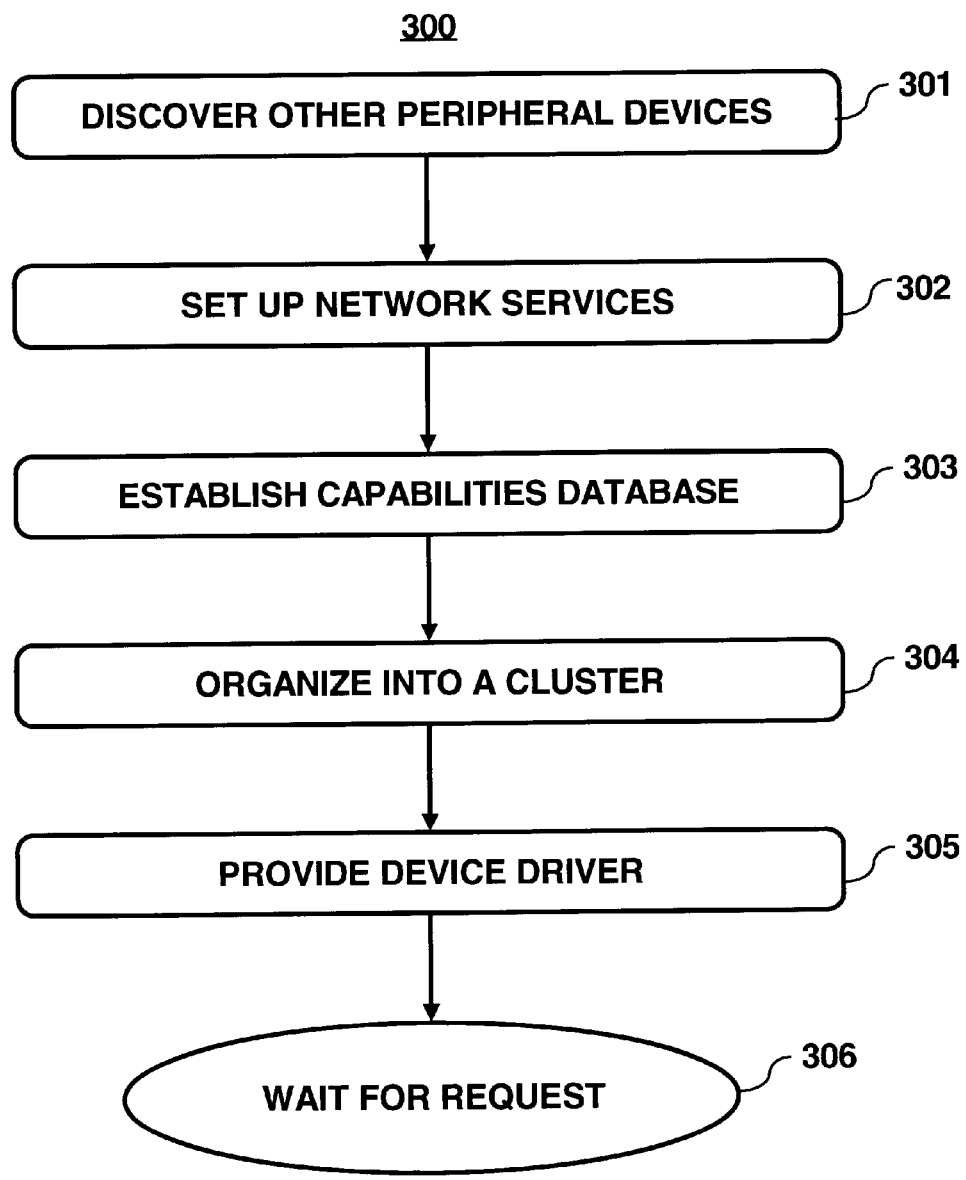
FIG. 3 is an exemplary flow diagram of the self-organization process in accordance with the principles of the present invention.

In accordance with the principles of the present invention, the peripheral devices 106A and/or the server storage 107 may organize themselves into a functioning network or cluster 108 of peripheral devices based on the proximity with respect to each other, and act to collectively fulfill a service request from a host computer 103. That is, one or more of the peripheral devices 106A. That is, one or more of the peripheral devices 106A and/or the server storage 107 close to each other may organize into a cluster of peripheral device(s) that acts as one logical peripheral device. For example, FIG. 3 illustrates an exemplary embodiment of the self organization into a cluster process 300 in accordance with the principles of the present invention.

The process 300 begins in step 301, when each of the peripheral devices 106A and/or the server storage 107 detect and discover any other peripheral device in the vicinity. In an embodiment of the present invention, e.g., obtained from the GPS device 104, each peripheral device 106A and/or the server storage 107 is configured to broadcast a signal indicative of its current location, and to receive location signals sent by the other peripheral devices. In an alternative embodiment, each of the peripheral devices 106A and/or the server storage 107 may determine its distance from the other peripheral devices based on a ranging information, e.g., based on the respective relative signal strength received from the other peripheral device.

In an embodiment of the present invention, each peripheral device 106A and/or the server storage 107 may be configured to detect those peripheral devices and/or the server storage that are within a predetermined range of distance (e.g., within N feet), exceeds a minimum signal strength level (e.g., M dB) and/or the like. Each of the parameters N and M may be set by the manufacturer of the peripheral devices, or alternatively, the parameters may be re-configurable in the field. Thus, in this particular embodiment, only those peripheral devices and/or the server storage that are close to each other and that have sufficient signal level may be selected to be a member of the particular cluster 108.

In a particular embodiment of the present invention, the discovering step (step 301) may be periodically repeated, e.g., in every O seconds, P minutes or the like. Or may be performed only on demand (i.e., when a user has a requirement for storage, printing, communications gatewaying, etc.). In this particular embodiment, each of the peripheral devices may ignore other peripheral devices, which have been present for less than a predetermined time duration Y, where Y may be set by the manufacturer of the peripheral device, or is configurable in the field.

Once all peripheral devices and/or the server storage meeting the criteria described above, e.g., within the predetermined degree of proximity to each other, are discovered, the discovered peripheral devices and/or the server storage collectively set up the basic network services in step 302. For example, in the case where the network communication between the peripheral devices 106A and the communication network 101 is implemented as the TCP/IP protocol, the discovered ones of the peripheral devices 106A may nominate one or more particular ones of the discovered peripheral devices to function as a router, a dynamic host configuration protocol (DHCP) server, a domain name system (DNS) server/relay, or the like to collectively communicate with the communication network 101.

In step 303, each of the discovered peripheral devices and/or the server storage learns and catalogues service capabilities of the other ones of the discovered peripheral devicesand/or the server storage, and establishes a database of each of the discovered peripheral device's capabilities, e.g., scanning speed and/or resolution, printing speed and/or resolution, color printing capabilities, printing capacity, binding/stapling capabilities or the like. The database may be stored within each of the peripheral devices, or alternatively, one or more selected peripheral devices may be nominated as the custodian to store and maintain the database. In an embodiment of the present invention, the discovery of service capabilities of the peripheral devices and/or the server storage may be implemented utilizing the service discovery protocol (SDP) as specified by the BLUETOOTH organization (more information may be obtained from their website, http://www.bluetooth.com/).

In step 304, the discovered peripheral devices and/or the server storage self organize themselves into a cluster 108, which appears to a host computer 103 or from one of the peripheral devices 106A as one entity or as one logical device, and of which the member peripheral devices act collectively to fulfill any service requests from the host computer 103 or from one of the peripheral devices 106A. The organization of the cluster, e.g., may take the form of one peripheral device acting as the lead device to perform the raster image process (RIP) and distribute a print job among the various member peripheral devices based on the respective capabilities of the peripheral devices. The organization may take the form, in which each member peripheral device knowing how to intelligently perform the RIP and distribute the print job among other member peripheral devices.

Typically, in order for a host computer to communicate with a peripheral device, an interface software (typically referred to as a "device driver") that acts as a low level interface to translate the service requests from a host computer 103 or from one of the peripheral devices 106A into a low level (hardware specific) language specific to the particular peripheral device is required to be installed on the host computer. In step 305, the clustered peripheral device(s) 108 may provide one or more device driver(s) to facilitate the communication between each of the member peripheral devices and the host computer 103.

The clustered peripheral device 108 may maintain device driver(s) for all operating systems (OS) that may be installed on a host computer 103, and provide the appropriate driver to any particular operating system of the host computer 103. In an embodiment of the present invention, a user interface, e.g., a web page, may be provided to list the device driver(s) available for the clustered peripheral devices 108. A user of a host computer may visit the user interface web page to select, download and/or install one or more device driver(s) from the list on his or her host computer 103. In a preferred embodiment of the present invention, a consolidated universal device driver that allows a host computer 103 to communicate with the cluster 108 as one logical device. The cluster 108 may then further provide lower level interface to each of the member peripheral device in the cluster 108 to distribute among one or more member peripheral devices in order to accomplish the tasks requested by the user of a host computer 103 or from one of the peripheral devices 106A.

Finally, once the peripheral devices 106A are organized into a cluster 108, the cluster 108 idles and waits for a request from a host computer 103 or from one of the peripheral devices 106A in step 306.

Figure 4:
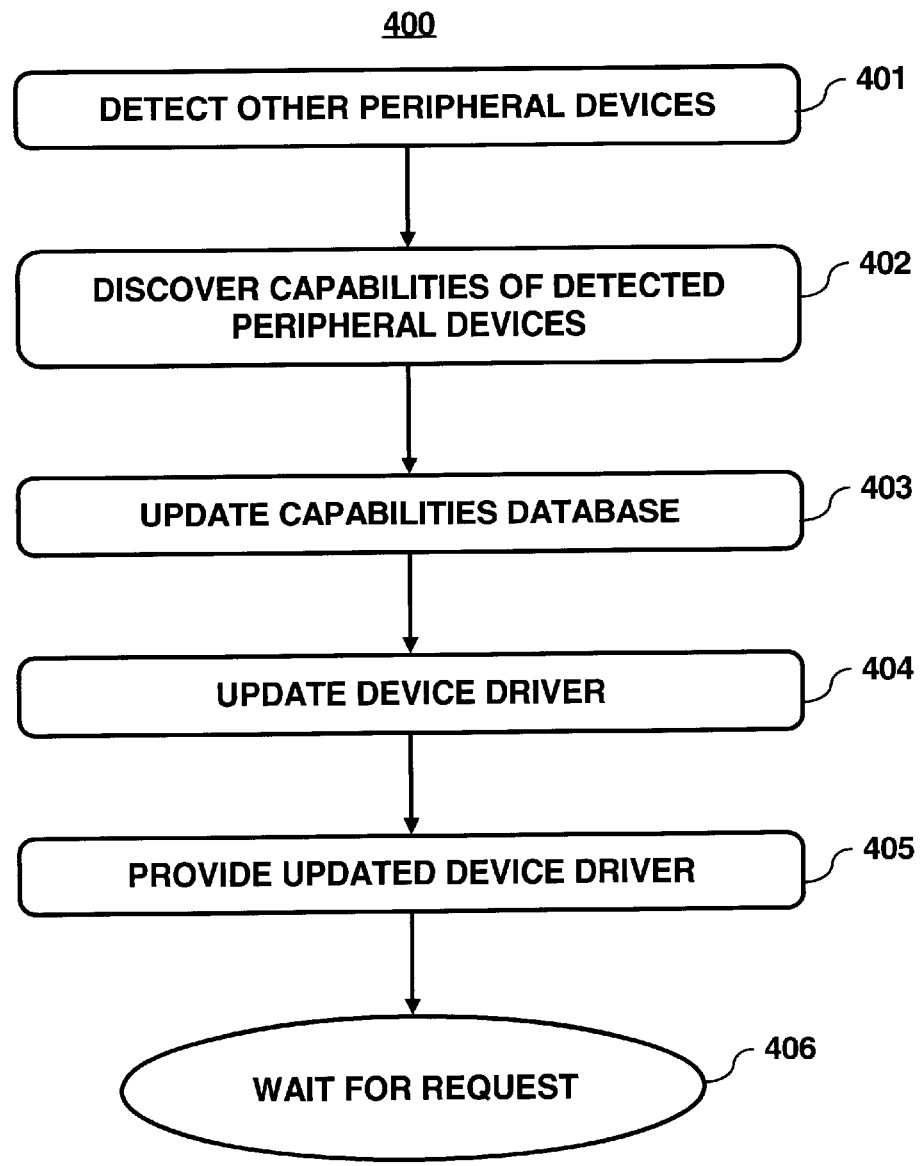
FIG. 4 is an exemplary flow diagram of the peripheral device(s) discovery process in accordance with the principles of the present invention.

When a new peripheral device is added in close proximity of a previously established cluster 108, the newly added peripheral device may be discovered by the cluster and may be added to the cluster as a new member. FIG. 4 shows an exemplary the new peripheral device(s) discovery and addition process 400. As shown, when the presence of a new peripheral device meeting the above described proximity criteria, e.g., N feet, is detected by any of the existing member peripheral device of the cluster 108 in step 401, the capabilities of the newly detected peripheral device is discovered in step 402. Then, in step 403, and the capabilities database of the cluster 108 is updated with a new entry corresponding to the newly discovered peripheral device.

In step 404, the device driver(s) maintained by the cluster 108, as previously described, is updated. As previously described, the device driver update may be accomplished by adding a device driver for the newly discovered peripheral device in the list of device drivers, or by modifying the consolidated universal driver.

In step 405, the cluster 108 provides the updated device driver(s), making available for a user of a host computer 103 to download, e.g., from a user interface web page as previously described. Finally, once the capabilities database and the device driver(s) are updated to reflect the addition of the newly discovered peripheral device, the cluster 108 idles and waits for a request from a host computer 103 or from one of the peripheral devices 106A in step 406.

Figure 5:
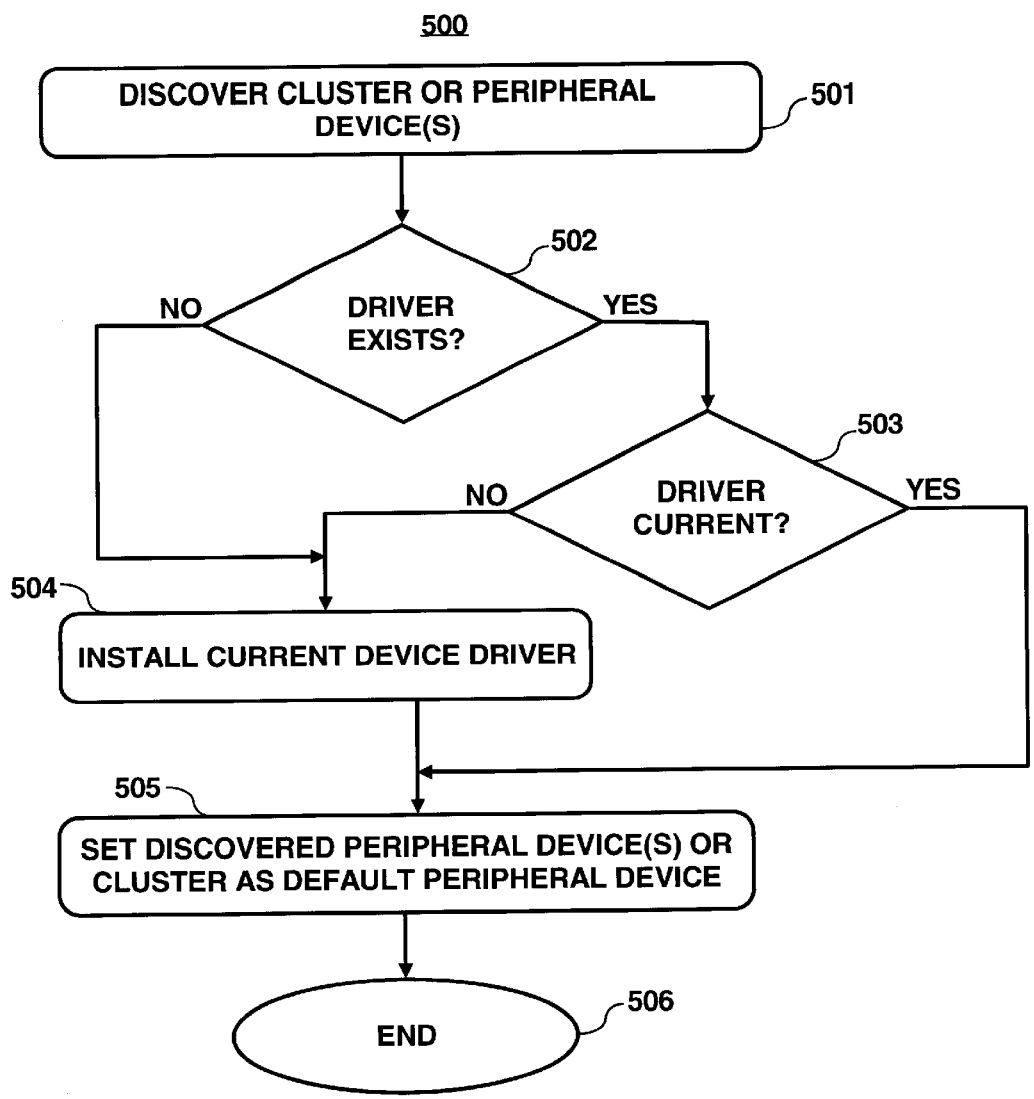
FIG. 5 is an exemplary flow diagram of the default peripheral device setting and clustered peripheral devices utilization process in accordance with the principles of the present invention.

Referring to FIG. 5, an exemplary embodiment of the automatic discovery and utilization of peripheral device(s) and/or a cluster of peripheral devices process 500 in accordance with the principles of the present invention will now be described. As shown, one or more peripheral devices or a cluster of peripheral devices are discovered by a host computer 103 or from one of the peripheral devices 106A in step 501. The discovery of peripheral devices or a cluster may be, e.g., in the earlier described on-line printing service example shown in FIG. 1, accomplished by the administration server 105 designating one or more peripheral device for the particular host computer 103 based on the proximity between the host computer 103 and the designated peripheral device(s).

In the clustered peripheral devices embodiment shown in FIG. 1A, the discovery of the cluster 108 may be accomplished by configuring the host computer 103 to detect those peripheral devices that are within a predetermined range of distance, exceeds a predetermined minimum signal strength level, or the like, as previously described. In an embodiment of the present invention, each of the predetermined range of distance and the predetermined minimum signal strength level may be re-configurable by the user of the particular host computer 103.

Once a cluster of peripheral devices and/or peripheral devices are found, the host computer 103 and the discovered peripheral device(s) or a cluster initiate a process typically referred to as a "hand-shake" process, in which a communication channel, e.g., a wireless communication link, between the host computer 103 and the peripheral device(s) and/or cluster is established to allow exchange of information therebetween. In the case of a clustered peripheral devices, the communication channel may be established between the host computer 103 and one of the peripheral device acting as the lead device of the cluster. During the hand-shake process, the host computer 103 may send information regarding its operating system (OS), e.g., the types and the version, to the peripheral device(s) or cluster, and may receive from the peripheral device(s) or cluster a list of the capabilities of each peripheral device (or the collective capability of the cluster) as maintained in the capabilities database as previously described and/or a list containing the file names and version/revision of the device drivers for each peripheral device or the cluster. As is known in the art, a device driver provides a low level interface between the operating system (OS) of the host computer and the device specific command structure of a particular peripheral device. As previously described, there may be a device driver for each of the discovered peripheral device(s) and/or a consolidated universal driver for the discovered cluster.

Then, in step 502, the host computer 103 determines whether it has one or more device driver(s) for the discovered peripheral device(s) installed thereon. In an embodiment of the present invention, the user of the host computer 103 may be provided with an option to select a desired one of the discovered peripheral device(s), and to check only for the presence of the device driver of the selected peripheral device. In the alternative, the host computer 103 may automatically, and without the intervention by the user, check for the presence of each of the device driver(s) in the list received.

If it is determined that device driver(s) for all of the discovered peripheral devices are already installed on the host computer 103, the host computer 103 determines whether the existing device drivers are the current up-to-date versions in step 503 by comparing the version/revision of each already installed device drivers with the version/revision information received during the hand-shake process described above.

If, on the other hand, one or more required device driver(s) are determined not to be present in step 502, or if any of already installed device driver is determined to be outdated in step 503, then, the host computer 103 acquires and installs the latest versions of the device drivers in step 504. In an embodiment of the present invention, an address of the location, e.g., the URL of a web site, where the latest version of the device drivers may be downloaded and provided to the host computer 103, may be provided by the peripheral devices or the cluster 108. The host computer 103 may download and/or install one or more device driver(s) from the location. In an alternative embodiment, the peripheral device(s) or the cluster 108 may have stored therein a copy of the device driver(s), and directly transmit the device driver(s) to the host computer 103, which then installs the received device driver(s).

Once the peripheral device(s) or a cluster of peripheral devices is (are) discovered, and once the corresponding device drivers are installed on the host computer 103, the host computer 103 may set the discovered peripheral device(s) and/or cluster as the default peripheral device for the host computer 103 in step 505, and the process 500 ends in step 506.

Once the peripheral devices and/or cluster are discovered and set as default peripheral device, whenever the host computer 103 (or any application program being run thereon) requests a peripheral device service, e.g., a print request, the request is fulfilled by the discovered peripheral(s) or cluster without requiring the user of the host computer 103 to have the knowledge of the network topology and/or his/her geographical location.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of utilizing one or more peripheral devices by a host computer over a network, comprising:

providing a geographical location determination capability to said host computer, said geographical location determination capability allowing said host computer to determine a current location of said host computer automatically without an intervention by a user of said host computer;

sending a peripheral device service request from said host computer to said network, said peripheral device service request including a location information indicating said current location of said host computer;

automatically selecting ones of said one or more peripheral devices being in closest proximity with said host computer based at least in part on said location information; and substantially immediately fulfilling said peripheral service request by said automatically selected ones of said one or more peripheral devices.

2. The method of utilizing one or more peripheral devices in accordance with claim 1, wherein said step of providing said geographical location determination capability comprises:

providing a global positioning system device to said host computer.

3. The method of utilizing one or more peripheral devices in accordance with claim 1, further comprising:

notifying said user of said automatically selected ones of said one or more peripheral devices.

4. The method of utilizing one or more peripheral devices in accordance with claim 3, further comprising:

providing a wireless communication device to said host computer, said wireless communication device enabling a wireless communication between said host computer and said network.

5. The method of utilizing one or more peripheral devices in accordance with claim 4, wherein:

said network comprises one or more on-line service provider servers to receive said peripheral device service request from said host computer.

6. The method of utilizing one or more peripheral devices in accordance with claim 5, wherein:

said one or more on-line service provider servers comprise one or more on-line printing service servers; and wherein said one or more peripheral devices comprise one or more print centers.

7. The method of utilizing one or more peripheral devices in accordance with claim 6, wherein said step of notifying comprises:

providing information with respect to a location of said automatically selected ones of one or more print centers to said user to allow said user to conveniently find said automatically selected ones of one or more print centers.

8. A method of utilizing one or more peripheral devices by a host computer, comprising:

providing each of said one or more peripheral devices a geographical location determination capability, said geographical location determination capability providing a geographic location of an associated one of said one or more peripheral device;

detecting, by at least a first one of said one or more peripheral devices, presence of one or more peripheral devices within a predetermined distance from said at least first one of said one or more peripheral devices; and organizing said detected ones of said one or more peripheral devices into a cluster of peripheral devices, said cluster being configured to fulfill a service request from said host computer collectively as one logical device.

9. The method of utilizing one or more peripheral devices in accordance with claim 8, wherein said step of organizing said detected ones of said one or more peripheral devices into said cluster further comprises:

setting up network services to enable communication among said detected ones of said one or more peripheral devices, and to enable communication between said detected ones of said one or more peripheral devices and said host computer; and establishing a service capabilities database, said service capabilities database cataloging service capabilities of each of said detected ones of said one or more peripheral devices;

wherein said cluster being configured to fulfill said service request from said host computer based at least in part said service capabilities database.

10. The method of utilizing one or more peripheral devices in accordance with claim 9, further comprising:

providing each of said one or more peripheral devices a wireless communication capability, said wireless communication capability enabling wireless communications among said one or more peripheral devices and wireless communications between said one or more peripheral devices and said host computer.

11. The method of utilizing one or more peripheral devices in accordance with claim 10, further comprising:

providing said host computer at least one device driver for peripheral devices in said cluster.

12. The method of utilizing one or more peripheral devices in accordance with claim 11, wherein:

said at least one device driver comprises a consolidated universal driver providing lower level interface between said host computer and each of peripheral device in said cluster.

13. The method of utilizing one or more peripheral devices in accordance with claim 10, further comprising:

providing said host computer a wireless communication capability, said wireless communication capability enabling wireless communications between said one or more peripheral devices and said host computer;

discovering said cluster by said host computer; and setting said discovered cluster as a default peripheral device for said host computer.

14. The method of utilizing one or more peripheral devices in accordance with claim 13, further comprising:

determining whether one or more device drivers for said cluster is installed on said host computer; and installing said one or more device drivers for said cluster if said one or more device drivers are not already installed on said host computer.

15. A networked peripheral devices system, comprising:

a communication network; and a cluster of one or more peripheral devices, each of said one or more peripheral devices having a geographical location determination capability, said geographical location determination capability providing a geographic location of an associated one of said one or more peripheral device, said one or more peripheral devices being within a predetermined distance from each other, said cluster being configured to fulfill a service request from a host computer received over said communication network collectively as one logical device.

16. The networked peripheral devices system according to claim 15, wherein:

said cluster comprises a service capabilities database, said service capabilities database cataloging service capabilities of each of said one or more peripheral devices;

wherein said cluster being configured to fulfill said service request from said host computer based at least in part said service capabilities database.

17. The networked peripheral devices system according to claim 15, wherein:

each of said one or more peripheral devices has a wireless communication capability, said wireless communication capability enabling wireless communications among said one or more peripheral devices and wireless communications between said one or more peripheral devices and said host computer.

18. The networked peripheral devices system according to claim 15, wherein:

said cluster is configured to provide said host computer at least one device driver for peripheral devices in said cluster.

19. The networked peripheral devices system according to claim 18, wherein:

said at least one device driver comprises a consolidated universal driver providing lower level interface between said host computer and each of peripheral device in said cluster.

20. The networked peripheral devices system according to claim 19, wherein:

said host computer is configured to determine whether said at least one device driver is installed on said host computer; and wherein said cluster is configured to provide installing said at least one device driver if said at least one device driver is not already installed on said host computer.

* * * * *